| United States Patent [19]
Sato et al.

[11] 3,878,250
[45] Apr. 15, 1975

[54] METHOD OF PREVENTING THE POLYMERIZATION OF METHACROLEIN

[75] Inventors: Ryozi Sato, Yokohama; Yasoyoshi Chinu, Tokyo; Tatuo Endo, Yokohama, all of Japan

[73] Assignee: The Japanese Geon Company, Ltd., Tokyo, Japan

[22] Filed: Aug. 30, 1971

[21] Appl. No.: 176,333

[30] Foreign Application Priority Data
Aug. 31, 1970 Japan.................................. 45-75596

[52] U.S. Cl........... 260/601 R; 260/80 PS; 260/625
[51] Int. Cl.............................................. C07c 47/20
[58] Field of Search..................................... 260/601

[56] References Cited
UNITED STATES PATENTS
2,478,989  8/1949  Walker........................... 260/601 R
2,874,100  2/1959  Brier et al..................... 260/601 R X
3,391,193  7/1968  Coyne et al..................... 260/601 R FOREIGN PATENTS OR APPLICATIONS
512,996  5/1955  Canada............................. 260/601

*Primary Examiner*—Donald G. Daus
*Assistant Examiner*—D. B. Springer
*Attorney, Agent, or Firm*—Sherman & Shalloway

[57] ABSTRACT

A method of preventing the polymerization of methacrolein, which comprises adding thereto, as a polymerization inhibitor, the combination of (i) at least one phosphoric acid compound and (ii) tert.butyl catechol in an amount sufficient to inhibit polymerization.

4 Claims, No Drawings

METHOD OF PREVENTING THE POLYMERIZATION OF METHACROLEIN

This invention relates to a method of stabilizing methacrolein, i.e. to a method of preventing the polymerization of methacrolein.

While methacrolein is a compound which is valuable as a starting material in the chemical industry, it is an extremely unstable compound which is likely to easily undergo a polymerization reaction with ease. Inter alia, in producing methacrolein by the vapor phase oxidation of isobutylene and further in the recovery, separation and purification operations in the series of steps for converting methacrolein to methacrylic acid by its vapor phase oxidation, or in synthesizing reactions which use methacrolein as the starting material and treatments of same for other purposes, a reaction, and particularly a polymerization reaction of methacrolein takes place when the methacrolein is exposed to elevated temperatures, e.g. about 70°C., and particularly 80°–150°C. or a still higher temperature. As a result, the polymer separates out in the system to either become adhered to the walls of the reactor or clog the lines, etc., and thereby causes serious problems in carrying out the operation. This results also in the loss of the methacrolein monomer (hereinafter referred to the monomer). This is a commercial as well as economic disadvantage.

As inhibitors for preventing the polymerization of methacrolein, numerous compounds such as the generally used hydroquinones, metal compounds, thiocarbamic acid, etc., are known. However, practically all of these compounds do not demonstrate any stabilizing effect at elevated temperatures. Further, even in those cases where no separation of polymer is seen, a decrease in the amount of monomer takes place. This loss of monomer is substantiated by analysis by means of gas chromatography for example. It is conceivable that the cause of this monomer loss resides in the decomposition of the monomer, the dimerization of the monomer resulting from conjugate double bonds or the formation of a low polymer of such an order as is not separated out, etc.

An object of the present invention is to provide a method of effectively stabilizing methacrolein, and especially a method of preventing the polymerization and loss of monomer at elevated temperatures, this object being achieved by the through the discovery of an inhibitor which does not possess the hereinbefore noted short comings.

Other objects and advantages of the invention will become apparent from the following description.

As a result of research with a view to achieving the foregoing objects, it has been found that the combination of (i) at least one oxyacid of phosphorus and (ii) tert.-butyl catechol is most useful as an inhibitor for methacrolein.

Examples of the oxyacid of phosphorus to be used in the invention include such as hypophosphorous acid, phosphorous acid, diphosphorous acid, isohypophosphoric acid, orthophosphoric acid, phosphinous acid, metaphosphoric acid and polyphosphoric acid. The phosphoric acid salts such as sodium polyphosphate and sodium methaphosphate are not included in the phosphoric acid compounds according to the invention.

That the inhibitor of the present invention demonstrates a unique function or effect is substantiated by, for example, the fact that while it demonstrates a marked stabilizing action in the case of methacrolein, it demonstrates practically no effect in the stabilization of acrolein, which has a structure similar to that of methacrolein, or the fact that while the numerous conventional inhibitors only demonstrate an apparent stabilizing effect (i.e. the separation of polymer is not seen) but cannot prevent the loss of monomer, the inhibitor of the present invention not only demonstrates an apparent stabilization effect but also has the effect of preventing in large measure the loss of monomer.

The inhibitor of the present invention exhibits over a prolonged period of time a stabilizing effect of such a marked degree as is not seen in the case of the conventional inhibitors even when it is exposed to elevated temperature, not to mention the case where it is exposed to low temperatures such as during the storage of the monomer. In addition, this effect is not diminished even when the monomer is contacted with stainless steel or ordinary steel (carbon steel). Again, even when water, organic acids such as methacrylic acid, ketones such as acetone, or the various organic solvents are present in the monomer, the stabilizing effect of the inhibitor is not diminished.

While the amount of the subject inhibitor (the sum total amount of the oxyacid of phosphorus and tert.-butyl catechol) to be added can be varied widely depending upon the environment of the monomer, e.g., temperature conditions, the class and amount of the solvent when the monomer is present in a solution, or other conditions, it is at least 0.001 % by weight, and usually 0.001–2 percent by weight, based on the monomer. The amount added may, of course, be increased, if desired. Further, the weight ratio of the oxyacid of phosphorus to tert.-butyl catechol is usually 1.0 : 0.1–2.0, and preferably 1.0 : 0.5–1.5, but can be suitably varied depending upon the conditions of use. Again, in practicing the invention method, the known inhibitors of unsaturated monomers may be suitably used conjointly.

The following non-limitative examples are given for more specifically illustrating the invention.

EXAMPLES I–V AND CONTROLS I–XI

The various inhibitors indicated in the following table were added to methacrolein in prescribed amounts, after which the mixtures were each charged in an ordinary steel container. The mixtures were heated to a temperature of 100°C. (80°C. in the case of Example IV) and held at this temperature for 5 hours, at the end of which period the state of polymer separation was observed to determine if an insoluble polymer was formed (State of Solution). When there was no separation of polymer, the solution was added dropwise into n-hexane, and the presence or absence of polymer was confirmed by whether or not a precipitate was then formed (Condition on dropping N-hexane). Further, the monomeric methacrolein content of the solution before its heating and after its heating was also determined by means of gas chromatography, and the decrease in monomer was obtained by a comparison of the two measurements (Monomer decrease). The amount of inhibitor added is shown as weight percent in the table. Further, the dash (—) mark in the table indicates where measurement was not made, since the sample was solidified by heating and measurement was deemed unnecessary.

The results obtained are shown in the following table.

| Experiment | | Inhibitor (%) | State of Solution | Condition on Dropping of n-Hexane | Monomer Decrease (%) |
|---|---|---|---|---|---|
| Example | I | orthophosphoric acid (0.1) p-t-butyl catechol (0.1) | Colorless & transparent | no precipitation | 1.8 |
| do. | II | orthophosphoric acid (0.01) p-t-butyl catechol (0.01) | do. | do. | 5.0 |
| do. | III | orthophosphoric acid (0.05) p-t-butyl catechol (0.05) | do. | do. | 2.7 |
| do. | IV | orthophosphoric acid (0.05) p-t-butyl catechol (0.05) | do. | do. | 0.0 |
| do. | V | phosphorous acid (0.05) p-t-butyl catechol (0.05) | do. | do. | 3.7 |
| Control | I | orthophosphoric acid (0.3) | large amount of white precipitate | — | — |
| do. | II | p-t-butyl catechol (0.3) | light yellow | no precipitation | 11.0 |
| do. | III | hydroquinone (0.3) | do. | do. | 12.4 |
| do. | IV | phenothiazine (0.3) | do. | do. | 10.6 |
| do. | V | palladium (0.3) | large amount of white precipitate | — | — |
| do. | VI | copper diethyl-dithiocarbamate (0.3) | light yellow | small amount of precipitate | 20.1 |
| do. | VII | palladium chloride (0.3) | white precipitate | — | — |
| Control | VIII | sodium polyphosphate (0.05) p-t-butyl catechol (0.05) | light yellow | no precipitation | 15.5 |
| do. | IX | sodium metaphosphate (0.05) p-t-butyl catechol (0.05) do. | do. | do. | 16.4 |
| do. | X | orthophosphoric acid (0.1) hydroquinone (0.1) | colorless & transparent | do. | 9.7 |
| do. | XI | orthophosphoric acid (0.01) hydroquinone (0.01) | light yellow | small amount of precipitate | 15.5 |

CONTROL XII

As a control 0.1 percent by weight of phosphoric acid and 0.1 percent by weight of tert.-butyl catechol, were added to acrolein. When this mixture was observed in its solution state as in the case with the examples and controls given hereinbefore, a large amount of precipitate was noted.

We claim:

1. A method of preventing the polymerization of methacrolein, which comprises adding thereto, as a polymerization inhibitor, the combination of (i) at least one phosphoric acid compound selected from the group consisting of hypophosphorus acid, phosphorous acid, diphosphorous acid, isohypophosphoric acid, orthophosphoric acid, pyrophosphoric acid, metaphosphoric acid and polyphosphoric acid and (ii) tert.-butyl catechol, the amount of (i) and (ii) being 0.001–2.0 percent by weight based on the weight of said methacrolein and the weight ratio of said phosphoric acid compound to tert.-butyl catechol being 1.1:0.1–2.0.

2. The method of claim 1 wherein said weight ratio of saisd phosphoric acid compound to tert.-butyl catechol is 1.0:0.5–1.5.

3. A polymerization-inhibited methacrolein composition comprising in addition to said methacrolein:
   i. at least one phosphoric acid compound selected from the group consisting of hypophosphorus acid, phosphorous acid, diphosphorous acid, isohypophosphoric acid, orthophosphoric acid, pyrophosphoric acid, metaphosphoric 4. The composition of claim 3 wherein said weight ratio of (i):(ii) is 1.0:0.5–1.5.

* * * * *

UNITED STATES PATENT OFFICE
CERTIFICATE OF CORRECTION

PATENT NO. : 3,878,250
DATED : April 15, 1975
INVENTOR(S) : RYOZI SATO, ET AL.

It is certified that error appears in the above-identified patent and that said Letters Patent are hereby corrected as shown below In the Heading, correct the spelling of the surname of the second-named inventor to read -- Chino --

Claim 5, line 2: cancel "saisd" and substitute -- said --

Claim 3, line 7: after "metaphosphoric" insert -- acid and polyphosphoric acid and (ii) tert.-butyl catechol the amount of (i) and (ii) being 0.001 - 2.0% by weight based on the weight of said methacrolein, the weight ratio of (i):(ii) being 1.0:0.1-2.0. --

Signed and sealed this 17th day of June 1975.

(SEAL)
Attest:

RUTH C. MASON
Attesting Officer

C. MARSHALL DANN
Commissioner of Patents
and Trademarks